United States Patent
Horn et al.

(10) Patent No.: US 6,526,509 B1
(45) Date of Patent: Feb. 25, 2003

(54) METHOD FOR INTERCHANGE OF CRYPTOGRAPHIC CODES BETWEEN A FIRST COMPUTER UNIT AND A SECOND COMPUTER UNIT

(75) Inventors: Günther Horn, München (DE); Klaus Müller, München (DE); Volker Kessler, Vierkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/952,155
(22) PCT Filed: May 13, 1996
(86) PCT No.: PCT/DE96/00835

§ 371 (c)(1),
(2), (4) Date: Nov. 10, 1997

(87) PCT Pub. No.: WO96/37064

PCT Pub. Date: Nov. 21, 1996

(30) Foreign Application Priority Data

May 19, 1995 (DE) .......................... 195 18 545
May 19, 1995 (DE) .......................... 195 18 544
May 19, 1995 (DE) .......................... 195 18 546

(51) Int. Cl.$^7$ ................................. H04L 9/00
(52) U.S. Cl. ................ 713/171; 380/277; 380/278
(58) Field of Search ............... 380/278, 277; 713/171, 168, 169, 176, 178, 181

(56) References Cited

U.S. PATENT DOCUMENTS 4,200,770 A  *  4/1980  Hellman et al. ............ 380/30
5,153,919 A     10/1992 Reeds, III et al. ........... 380/44
5,222,140 A  *  6/1993  Beller et al. ................ 380/30

FOREIGN PATENT DOCUMENTS

EP  0 307 627 A1  3/1989
EP  0 460 538 A2  11/1991

OTHER PUBLICATIONS

Schneier, Applied Cryptography, Oct. 1993.*
Menezes et al, Handbook of Applied Cryptography, Oct. 1996.*
Schneier, Applied Cryptography, 1994, Wiley & Sons, Inc., pp. 34, 35, 45, 46, 372, 425–428.*
IEE Proceedings—Computers and Digital Techniques, May 1994, vol. 141, No. 3, L. Harn, Public–Key Cryptosystem Design Based on Factoring and Discrete Logarithms, pp. 193–195.
IEEE Global Telecomumunications Conference, (1993), vol. 1, H. Tsubakiyama, Security for Information Data Broadcasting system with Conditional–Access Control, pp. 164–170.
IEEE Personal Communications,(1994), A. Aziz, Privacy and Authentication for Wireless Local Area Networks, pp. 25–31.
IEEE Journal on Selected Areas in Communications, (1993), vol. 11, No. 6, M. Beller et al, Privacy and Authentication on a Portable Communications System, pp. 821–829.
Joint Experts Meeting on Privacy and Authentication for Personal Communications, P&A JEM (1993), M. Beller, Proposed Authentication and Key Agreement Protocol for PCS, pp. 1–12.

* cited by examiner

*Primary Examiner*—Gail Hayes
*Assistant Examiner*—Ho S. Song
(74) *Attorney, Agent, or Firm*—Morrison & Foerster, LLP

(57) ABSTRACT

The method provides that a session code (K) can be agreed between a first computer unit (U) and a second computer unit (N), without it being possible for any unauthorized third party to gain access to useful information relating to the codes or the identity of the first computer unit (U). This is achieved by embedding the principle of the El-Gamal code interchange in the method, with additional formation of a digital signature via a hash value of the session code (K) which is formed by the first computer unit (U).

5 Claims, 8 Drawing Sheets

METHOD FOR INTERCHANGE OF CRYPTOGRAPHIC CODES BETWEEN A FIRST COMPUTER UNIT AND A SECOND COMPUTER UNIT

BACKGROUND OF THE INVENTION

Information technology systems are subject to various threats. For example, transmitted information can be monitored and changed by an unauthorized third party. A further threat relating to communication between two communication partners is the use of a false identity of one communication partner under false pretences.

These and other threats are countered by various security mechanisms which are intended to protect the information technology system against the threats. One security mechanism which is used for protection is the encryption of the transmitted data. In order that the data in a communication link between two communication partners can be encrypted, steps must first be taken before the transmission of the actual data to prepare for the encryption. The steps may comprise, for example, the two communication partners using the same encryption algorithm, and the common, secret code possibly being agreed.

The security mechanism for encryption in the case of mobile radio systems is gaining particular importance, since the transmitted data in these systems can be monitored by any third party without any special additional cost.

This leads to the requirement to make a choice of known security mechanisms and to combine these security mechanisms in a suitable manner and to specify communication protocols such that they ensure the security of information technology systems.

Various asymmetric methods are known for computer-aided interchange of cryptographic codes. Asymmetric methods, which are suitable for mobile radio systems are (A. Aziz, W. Diffie, "Privacy and Authentication for Wireless Local Area Networks", IEEE Personal Communications, 1994, pages 25 to 31) and (M. Beller, "Proposed Authentication and Key Agreement Protocol for PCS", Joint Experts Meeting on Privacy and Authentication for Personal Communications, P&A JEM 1993, 1993, pages 1 to 11).

The method described in (A. Aziz, W. Diffie, "Privacy and Authentication in Wireless Local Area Networks", IEEE Personal Communications, 1994, pages 25 to 31) relates expressly to local networks and places more stringent computation performance requirements on the computer units of the communication partners while interchanging the codes. In addition, more transmission capacity is required in the method than in the method according to the invention, since the length of the messages is greater than in the case of the method according to the invention.

The method described in (M. Beller, "Proposed Authentication and Key Agreement Protocol for PCS", Joint Experts Meeting on Privacy and Authentication for Personal Communications, P&A JEM 1993, 1993, pages 1 to 11) did not implement a number of basic security aims. Explicit authentication of the network by the user is not achieved. In addition, a code which is transmitted by the user to the network is not confirmed to the user by the network. In addition, no assurance is provided regarding the freshness (current validity) of the code for the network. A further disadvantage of this method is the limitation to the Rabin method for the implicit authentication of the code by the user. This limits the method in a relatively flexible application.

Furthermore, no security mechanism is provided to ensure that transmitted data cannot be disputed. This is a considerable disadvantage, particularly when producing charge invoices, which cannot be contested, for a mobile radio system. The limitation of the method to the National Institute of Standards in Technology Signature Standard (NIST DSS) as the signature function used also limits the general applicability of the method.

A method for secure data interchange between a large number of subscribers, involving an actual certificate, has been disclosed (U.S. Pat. No. 5,214,700). The protocol used in this method has a random number, an identity statement as well as a public code and a session code. However, this method does not implement basic security aims.

Furthermore, a method has been disclosed for PC-PC communication with the involvement of a trust center (DE Brochure: Telesec. Telekom, Produktentwicklung Telesec beim Fernmeldeamt Siegen [Telesec product development at the Siegen Telecommunications Authority], pages 12–13 and FIG. 16).

U.S. Pat. No. 5,222,140 discloses a method in which a session code is produced using both a public code and a secret code, as well as using a random number. This session code is linked to a public code.

Furthermore, U.S. Pat.No. 5,153,919 describes a method in which a user unit identifies itself to a network unit. An authentication process then takes place, using a hash function between the user unit and the network unit.

Other secure communication protocols are known, but do not implement essential, basic security aims (M. Beller et al, Privacy and Authentication on a Portable Communication System, IEEE Journal on Selected Areas in Communications, Vol. 11, No. 6, pages 821–829, 1993).

SUMMARY OF THE INVENTION

The problem to which the invention relates is to specify a simplified method for computer-aided interchange of cryptographic codes.

A first value is formed in the first computer unit from a first random number with the aid of a generating element of a finite group, and a first message is transmitted from the first computer unit to the second computer unit, the first message having at least the first value. A session code is formed in the second computer unit with the aid of a first hash function, a first input variable of the first hash function having at least one first term which is formed by exponentiation of the first value with a secret network code. The session code is formed in the first computer unit with the aid of the first hash function, a second input variable of the first hash function having at least one second term which is formed by exponentiation of a public network code using the first random number. Furthermore, a fourth input variable is formed in the first computer unit with the aid of a second hash function or of the first hash function, a third input variable for the first hash function or for the second hash function having at least the session code in order to form the fourth input variable. Then, a signature term is formed in the first computer unit from at least the fourth input variable, using a first signature function. A third message is transmitted from the first computer unit to the second computer unit, the third message having at least the signature term of the first computer unit. The signature term is verified in the second computer unit.

The advantages achieved by the method according to the invention are primarily a considerable reduction in the length of the transmitted messages and the implementation of further security aims.

The method according to the invention achieves the following security aims:
- mutual explicit authentication by the user and the network, that is to say mutual verification of the asserted identity,
- code agreement between the user and the network with mutual implicit authentication, that is to say that the method results in a common, secret session code being available after completion of the procedure, from which each party knows that only the authentic opposite number may also be in possession of the secret session code,
- assurance of the freshness (current validity) of the session code for the user,
- mutual confirmation of the session code by the user and the network, that is to say the confirmation that the opposite number is actually in possession of the agreed secret session code.

The following advantageous developments of the method also relate to these security aims.

The first message also has an identity statement of a certifying computer unit, which supplies a network certificate which can be verified by the first computer unit. A second message is transmitted from the second computer unit to the first computer unit, the second message having at least the network certificate. The network certificate is verified in the first computer unit.

In this development of the method trustworthy public user code of the first computer unit, for example in the form of a user certificate, is additionally made available in the first computer unit, and a trustworthy public network code of the second computer unit, for example in the form of a network certificate, is made available in the second computer unit. In this development, the public network code need not be available in the first computer unit.

A third message is transmitted from the first computer unit to the second computer unit, the third message also having a user certificate. The use, certificate is verified in the second computer unit.

As a result of this development of the method, it is not necessary for the public user code to be available in the second computer unit.

The first message also has an identity variable of the first computer unit and an identify statement of a certifying computer unit, which supplies to the first computer unit a network certificate which can be verified by the first computer unit. A fourth message is transmitted from the second computer unit to the certifying computer unit, the fourth message having at least the public network code, the first value and the identify variable of the first computer unit as input variable, and an output variable of a third hash function being signed using a second signature function. The first signed term is verified in the certifying computer unit. A third term is formed in the certifying computer unit, which third term has at least the first value, the public network code and an identity statement of the second computer unit. A hash value up to the third term is formed in the certifying computer unit using a fourth hash function. The hash value up to the third term is signed in the certifying computer unit using a third signature function with a secret certifying code. A network certificate is formed in the certifying computer unit, which network certificate has at least the third term and the signed hash value of the third term. A fourth hash function is applied in the certifying computer unit to a fifth term, which has at least the identity statement of the second computer unit and a user certificate. The hash value of the fifth term is signed using the third signature function with the secret certifying code, and the result represents the second signed term. A fifth message, which has at least the network certificate, the fifth term and the second signed term, is transmitted from the certifying computer unit to the second computer unit. The network certificate and the second signed term are verified in the second computer unit. A fourth term, which has at least the public network code and the signed hash value of the third term, is formed in the second computer unit. A second message is transmitted from the second computer unit to the first computer unit, the second message having at least the fourth term. The network certificate is verified in the first computer unit.

In this development of the method, there is no need for a trustworthy public network code of the second computer unit in the first computer unit. A trustworthy public certifying code of the certifying computer unit is available in the first computer unit. This means that the first computer unit has to "supply" the trustworthy public network code in the form of a network certificate from a certifying computer unit. In the same way, the second computer unit needs the trustworthy public user code in the form of a user certificate from the certifying computer unit.

An intermediate code is formed in the first computer unit before the formation of the first message, in that a public certifying code is raised to the power of the first random number. A second encrypted term is formed in the first computer unit before the formation of the first message from the identity variable of the first computer unit, in that the identity variable is encrypted with the intermediate code using an encryption function. The first message has the second encrypted term instead of the identity variable of the first computer unit. The fourth message has the second encrypted term instead of the identity variable of the first computer unit. The second encrypted term is decrypted in the certifying computer unit once the fourth message has been received.

Furthermore, at least one of the variables, the identity statement of the second computer unit, the identity variable of the first computer unit, the public network code or the user certificate is checked in the certifying computer unit, using a revocation list.

Further developments of the method achieve the security aim of user anonymity, that is to say the confidentiality of the identity of the user with respect to third parties.

The first message also has at least one old temporary identity variable of the first computer unit. A new temporary identity variable is formed for the first computer unit, in the second computer unit, once the first message has been received and before the second message is formed. A fourth encrypted term is formed from the new temporary identity variable of the first computer unit, in which the new temporary identity variable of the first computer unit is encrypted with the session code, using the encryption function. The second message additionally has at least the fourth encrypted term. The fourth encrypted term is decrypted in the first computer unit, once the second message has been received and before the fourth input variable is formed. The third input variable for the first hash function or for the second hash function, in order to form the fourth input variable, also has at least the new temporary identity variable of the first computer unit. The third message does not have the identity variable of the first computer unit.

This development of the method makes it possible to use temporary user identities.

A response, which contains information relating to the session code, is formed in the second computer unit. A second message is transmitted from the second computer unit to the first computer unit, the second message having at least the response. The session code is checked in the first computer unit, using the response.

This development of the method primarily ensures additional authentication of the second computer unit with respect to the first computer unit.

In the second computer unit, the first input variable of the first hash function also has at least one second random number. The second message also has the second random number. In the first computer unit, the second input variable of the first hash function also has at least the second random number.

This development achieves the security aim of assurance of freshness (current validity) of the session code for the network.

A third encrypted term is formed in the first computer unit before the formation of the third message, in that an optional second data field is encrypted with the session code, using the encryption function. The third message also has at least the third encrypted term. The third encrypted term is decrypted in the second computer unit, once the third message has been received.

This development of the method in addition achieves the security aim of the data which have been transmitted from the user to the network being indisputable.

The method according to the invention can also very easily be adapted to different requirements since it is not limited to specific algorithms for signature formation and encryption.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

First Exemplary Embodiment

Figure 1:
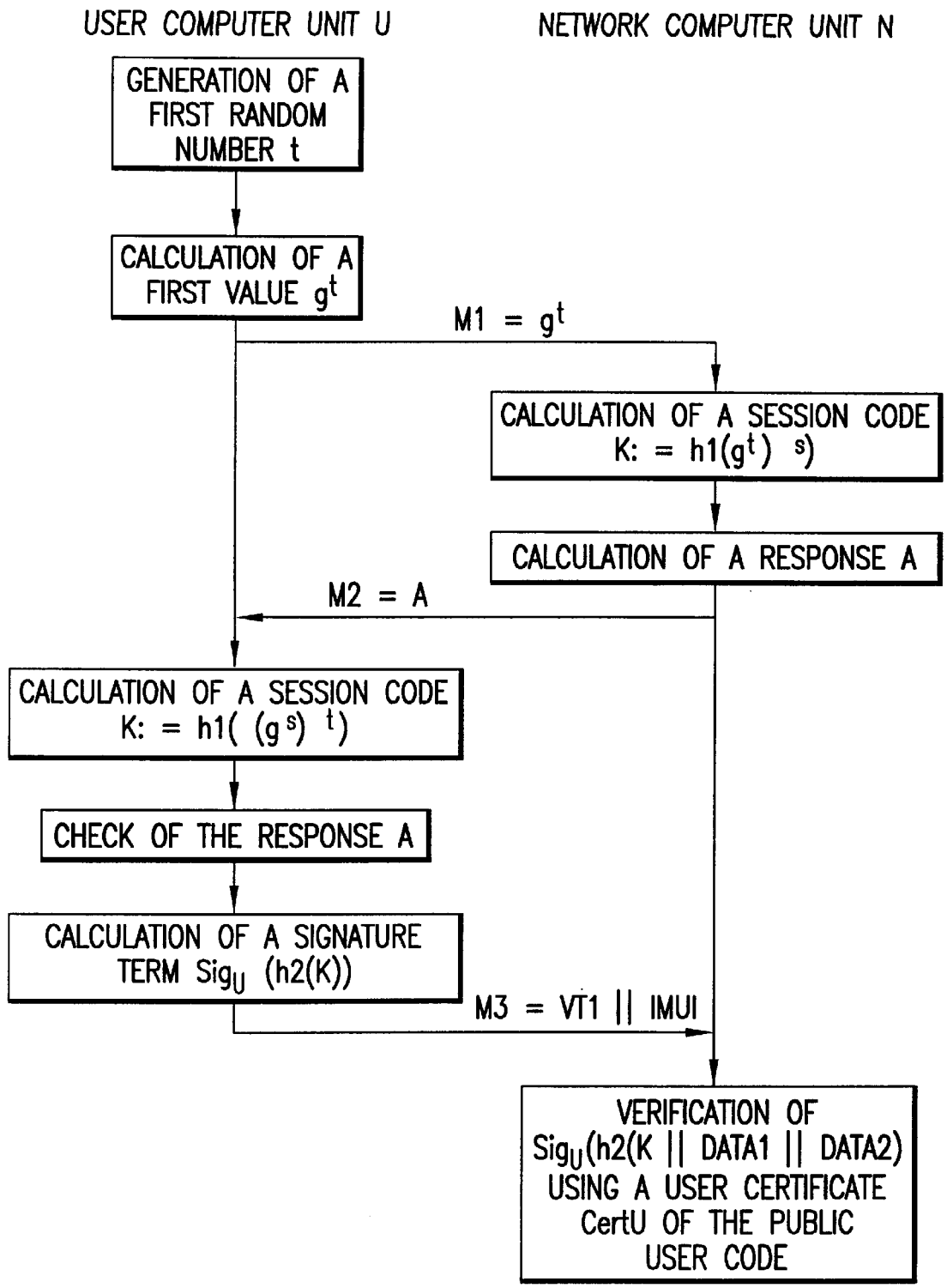
FIG. 1 shows a flow chart which illustrates a first exemplary embodiment of the method according to the invention with a number of developments.
Figure 2:
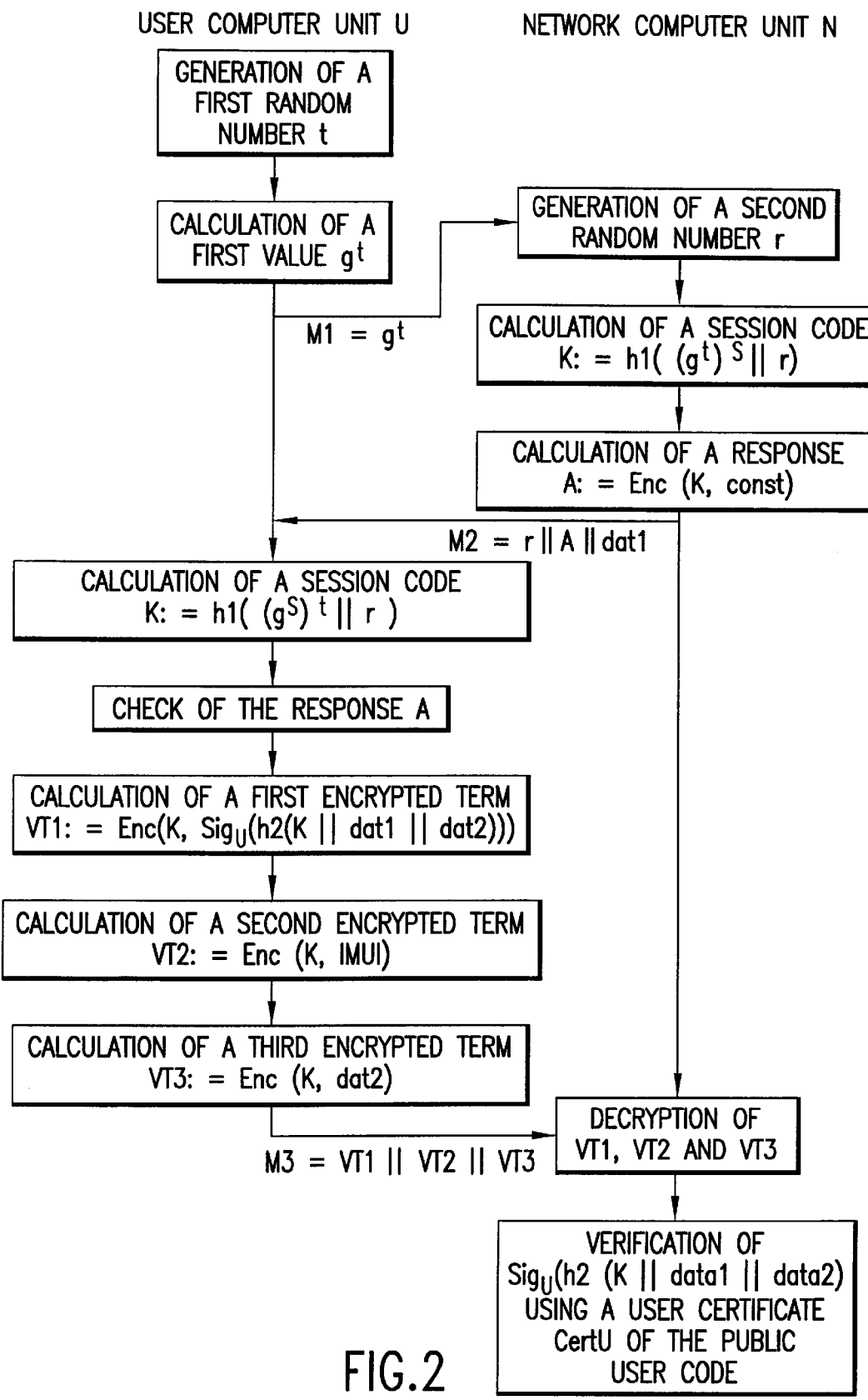
FIG. 2 shows a flow chart which describes the first exemplary embodiment of the method according to the invention, with additionally-implemented security aims and with a number of developments.

The sequence of the method according to the invention is illustrated by two sketches in FIGS. 1 and 2. The method according to the invention relates to the interchange of cryptographic codes between a first computer unit U and a second computer unit N, the first computer unit U being understood to be a computer unit of a user of a mobile radio network, and a second computer unit N being understood stood to be a computer unit of the network operator of a mobile radio system.

However, the invention is not limited to a mobile radio system, and thus not to a user of a mobile radio system and to the network either, but can be applied in all areas in which cryptographic code interchange is required between two communication partners. This may be the case, for example, in a communication link between two computers which wish to interchange data in encrypted form. Thus, in the following text, a first communication partner is called the first computer unit U, and a second communication partner the second computer unit N, without any limitation to general applicability.

The method according to the invention in claim 1 is subject to the precondition that a trustworthy public network code $g^s$ of the second computer unit N is available in the first computer unit U, and in that a trustworthy public user code $g^u$ of the first computer unit U is available in the second computer unit N, g being a generating element of a finite group.

A first random number t is generated in the first computer unit U. A first value $g^t$ is formed in the first computer unit U from the first random number t with the aid of the generating element g.

Asymmetric methods are based essentially on two problems of complexity theory, namely the problem of efficiently factorizing composite numbers, and the discrete logarithm problem (DLP). The DLP relates to the fact that, although exponentiations can be carried out efficiently in suitable computation structures, no efficient algorithms are known for the reverse of this operation, taking logarithms, however.

Such computation structures may be regarded as being, for example, among the finite groups quoted above. These are, for example, the multiplicative group of a finite body (for example multiplication of modulo p, where p is a large prime number), or else so-called "elliptical curves". Elliptical curves are primarily of interest since they allow considerably shorter security parameters for the same security level. This relates to the length of the public codes, the length of the certificates, the length of the messages which have to be interchanged to agree the session code, and the length of digital signatures, which are in each case described in the following text. The reason for this is that the known methods for taking logarithms for elliptical curves are considerably less efficient than those for finite bodies.

A large prime number in this context means that the size of the prime number must be chosen such that taking the logarithm is so complex that it cannot be carried out in a reasonable time. In this context, reasonable means a time period corresponding to the security policy of several years to decades or longer.

Once the first value $g^t$ has been calculated, a first message M1 is coded, which has at least the first value $g^t$. The first message M1 is transmitted from the first computer unit U to the second computer unit N.

The first message M1 is decoded in the second computer unit N. The first message M1 can also be transmitted unencrypted, via an insecure channel, that is to say via a radio interface as well, since it is not possible to take the logarithm of the first value $g^t$ in a reasonable time.

As described in FIG. 2, it is possible to provide for a second random number r to be generated in the second computer unit N. This additional method step achieves an additional security aim: the assurance of the freshness (current validity) of a session code K, which is described in the following text, for the second computer unit N.

A session code K is formed in the second computer unit N with the aid of a first hash function h1. At least one first term is used as a first input variable of the first hash function h1. The first term is formed by the first value $g^r$ being raised to the power of a secret network code S.

In this context, a hash function should be understood to be a function in which it is not possible to calculate a matching input value for a given function value. Further-more, an output character sequence of fixed length is assigned to an input character sequence of any required length. In addition, freedom from collisions is required for the hash function in this context, that is to say it must not be possible to find two different input character sequences which give the same output character sequence.

If the second random number r is used, then the first input variable of the first hash function h1 also has at least the second random number r.

A response A is now formed in the second computer unit N. Various versions are provided for formation of the response A. Thus, for example, it is possible for a constant const to be encrypted with the session code K, using an encryption function Enc. The constant const is known both by the first computer unit U and by the second computer unit N. The encryption function Enc is also known both by the second computer unit N and by the first computer unit U, as the encryption function which is to be used in the method.

A further option for forming the response A is, for example, to use the session code K as an input variable for a third hash function h3 and to use the "hashed" value of the session code K as the response A. Other options for forming the response A which is used to check the session code K in the first computer unit U are known to the person skilled in the art and may be used as variants of the described procedures.

A second message M2 is formed by arranging in sequence the second random number r, the response A and an optional first data field dat1. The second random number r and the optional first data field dat1 are contained only in the second message M2, if this is provided in the method according to the invention.

The second message M2 is coded in the second computer unit N and is transmitted to the first computer unit U.

The second message M2 is decoded in the first computer unit U, so that the first computer unit U may have available the second random number r, the response A and, possibly, the optional first data field dat1. The optional first data field dat1 may be of any required length, that is to say it is even possible for the optional first data field dat1 not to be present.

The session code K is now likewise formed in the first computer unit U, with the aid of the first hash function h1, which is known both by the second computer unit N and by the first computer unit U. A second input variable of the first hash function h1 has at least one second term, in order to form the session code K in the first computer unit U. The second term is formed from exponentiation of a public network code $g^s$ with the first random number t. If the use of the second random number r is envisaged in the method according to the invention, then the second input variable of the first hash function h1 also has the second random number, in order to form the session code K in the first computer unit U.

The use of the first random number t and of the second random number r in the generation of the session code K ensures that the session code K is currently valid, since the first random number t and the second random number r are in each case used only for in each case one session code K.

This avoids a relatively old code being reused as the session code K. The current validity of the session code K is also important in the context of the question as to how large the first random number t and the second random number r must be. This is significant since the DLP problem is reduced if the random numbers have a shorter length, that is to say the shorter the random number, the easier it is to take the logarithm, that is to say, for example, to find the first random number t from the first value $g^r$. However, if different random numbers are used for each new session code K, then the probability that the session code K which is used has already been found by an unauthorized third party is considerably less. In consequence, the risk that the part of a message which is encrypted with the session code K can be decrypted by an unauthorized third party is considerably reduced.

Once the session code K has been formed in the first computer unit U, the received response A is used to check whether the session code K formed in the first computer unit U corresponds with the session code K which has been formed in the second computer unit N. Various options for using the response A to check the session code K are envisaged, depending on the variants described above for formation of the response A.

One option, for example, if the response A has been formed in the second computer unit N by encryption of the constant const with the session code K, using the encryption function Enc, is to decrypt the response A, which results in the first computer unit U receiving a decrypted constant const', which is compared with the known constant const.

The checking of the session code K using the response A can also be carried out by the constant const, which is known by the first computer unit U, being encrypted with the session code K, which is formed in the first computer unit U, using the encryption function Enc, and the result being checked for correspondence with the response A. This procedure is also used, for example, when the response A is formed in the second computer unit N, by applying the third hash function h3 to the session code K. In this case, the session code K, which is formed in the first computer unit U, is used in the first computer unit U as the input variable of the third hash function h3. The "hashed" value of the session code K which is formed in the first computer unit U is then checked for correspondence with the response A. This achieves the aim of code confirmation of the session code K.

The second computer unit N is authenticated by the first computer unit U as a result of the fact that the secret network code o is used to calculate the session code K in the second computer unit N, and the public network code $g^s$ is used to calculate the session code K in the first computer unit U. This is achieved provided that the first computer unit U knows that the public network code $g^s$ actually belongs to the second computer unit N.

A signature term is calculated once the session code K has been confirmed by checking the response A. A fourth input variable is formed for this purpose, with the aid of a second hash function h2. The second hash function h2 can be, but need not be, the same hash function as the first hash function h1. A term which contains at least the session code K is used as a third input variable for the second hash function h2. Furthermore, the third input variable may contain the optional first data field dat1 or else an optional second data field dat2, if its use is envisaged in the method according to the invention.

Later, it is not possible to dispute that the data which are contained in the first optional data field dat1 and in the second optional data field dat2 have been transmitted from the first computer unit U.

The data contained in the first optional data field dat1 and in the second optional data field dat2 may be, for example, telephone numbers, the current time or similar parameters suitable for this purpose. This information may be used as a tool for indisputable charge invoicing.

The signature term is formed from at least the fourth input variable, using a first signature function $Sig^U$. The signature term may be encrypted in order to achieve a higher security level. In this case, the signature term is encrypted with the session code K, using the encryption function Enc, and forms the first encrypted term VT1.

In addition, if it is intended to achieve the security aim of "anonymity of the user", a second encrypted term VT2 is calculated, in which an identity variable IMUI of the first computer unit U is encrypted with the session code K, with the aid of the encryption function Enc. If an optional second data field dat2 is used, a third encrypted term VT3 is calculated in the first computer unit U, in that the optional second data field dat2 is encrypted with the session code K, using the encryption function Enc, although the optional second data field dat2 can also be transmitted unencrypted.

A third message M3 is formed and coded in the first computer puter unit U and has at least the signature term and the identity variable IMUI of the first computer unit U.

If it is intended to ensure the anonymity of the first computer unit U, the third message M3 has at least the second encrypted term VT2 instead of the identity variable IMUI of the first computer unit U, which term VT2 contains the information about the identity of the first computer unit U in encrypted form, which can be decrypted only by the second computer unit N.

If it is intended to use the optional second data field dat2, the third message M3 also has at least the third encrypted term VT3 or the optional second data field dat2 in plain text.

If the third message M3 contains the first encrypted term VT1, the second encrypted term VT2 or the third encrypted term VT3, these are decrypted in the second computer unit N. For the first encrypted term VT1, which may be present, this is done before the verification of the signature term.

The third message M3 is transmitted from the first computer unit U to the second computer unit N.

In addition, the authentication of the first computer unit U with respect to the second computer unit N is ensured by the signature term, whose use guarantees that the third message M3 was actually transmitted, in a form valid at that time, from the first computer unit U.

The third message M3 is decoded in the second computer unit N, and the signature term is then verified on the basis of a user certificate CertU, which is available to the second computer unit N.

If temporary user identities are envisaged for the method according to the invention, then the method described above is expanded by a number of method steps.

First, it is necessary to tell the second computer unit N which first computer unit U is intended to be assigned a new temporary identity variable TMUIN by the second computer unit N.

To this end, an old temporary identity variable TMUIO is transmitted from the first computer unit U to the second computer unit N, as an additional component of the first message M1.

After receiving the first message M1, the second computer unit N thus knows the first computer unit U for which the new temporary identity variable TMUIN is intended.

The new temporary identity variable TMUIN for the first computer unit U is now formed in the second computer unit N. This can be done, for example, by generating a random number or by tables in which possible identity variables are stored. A fourth encrypted term VT4 is formed in the second computer unit N from the new temporary identity variable TMUIN of the first computer unit U, in that the new temporary identity variable TMUIN of the first computer unit U is encrypted with the session code K, using the encryption function Enc.

In this case, the second message M2 additionally has at least the fourth encrypted term VT4. The fourth encrypted term VT4 is then decrypted in the first computer unit U. The new temporary identity variable TMUIN of the first computer unit U is now available in the first computer unit U.

In order also to ensure the second computer unit N that the first computer unit U has received the new temporary identity variable TMUIN correctly, the third input variable for the first hash function h1 or for the second hash function h2 also has at least the new temporary identity variable TMUIN of the first computer unit U.

Since the signature term contains the information relating to the new temporary identity variable TMUIN in this case, the third message M3 no longer has the identity variable IMUI of the first computer unit U.

It is also possible for the new temporary identity variable TMUIN not to be integrated in the signature term, but to form the second encrypted term VT2, in that the new temporary identity variable TMUIN is encrypted, instead of the identity variable IMUI of the first computer unit U, with the session code K, using the encryption function Enc. In this case, the third message M3 also has the second encrypted term VT2.

The hash functions used in the method according to the invention, the first hash function h1, the second hash function h2 and the third hash function h3, can be implemented by the same hash functions, or else by different hash functions.

Second Exemplary Embodiment

Figure 3:
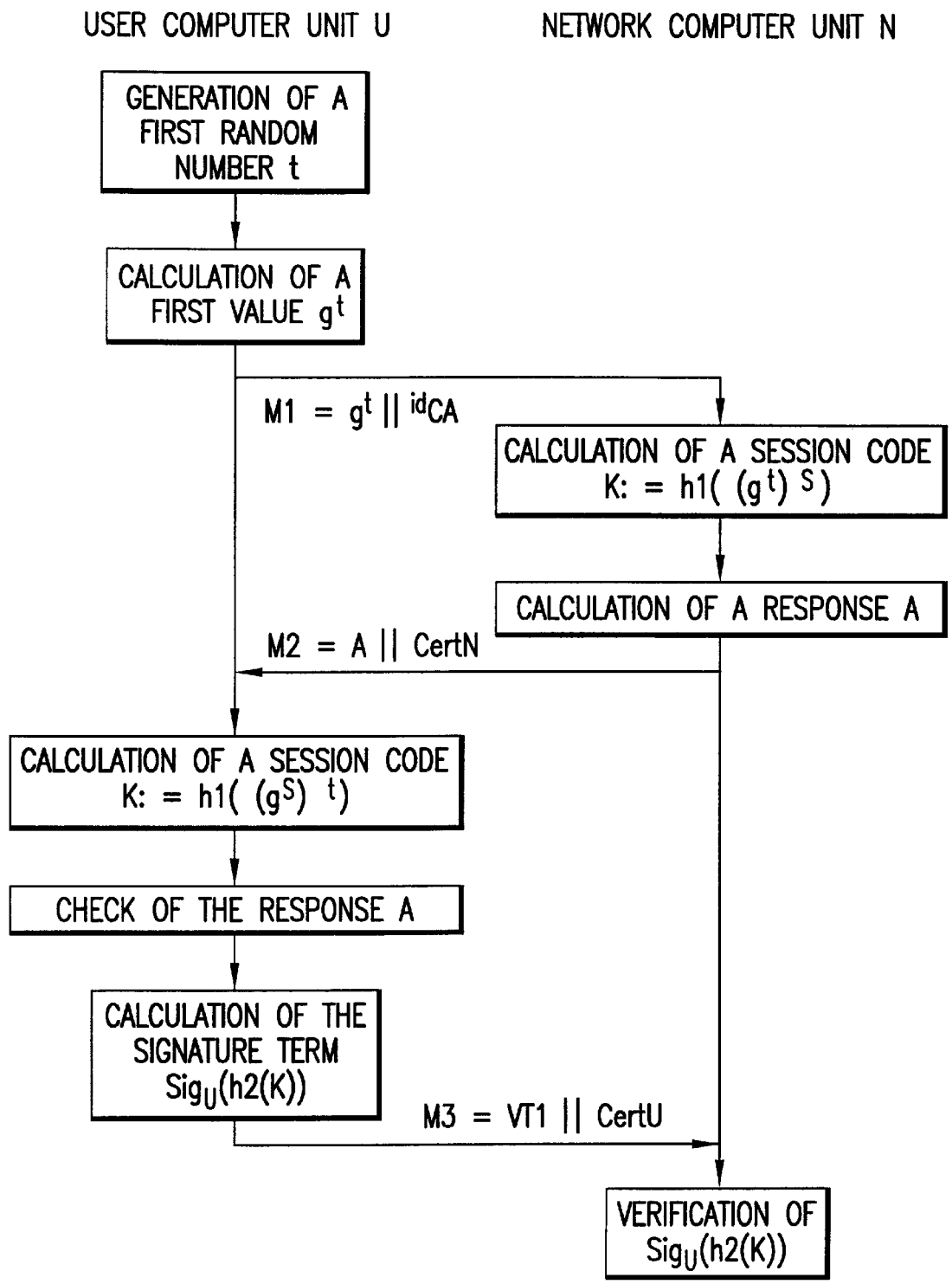
FIG. 3 shows a flow chart which illustrates a second exemplary embodiment of the method according to the invention with a number of developments.
Figure 4:
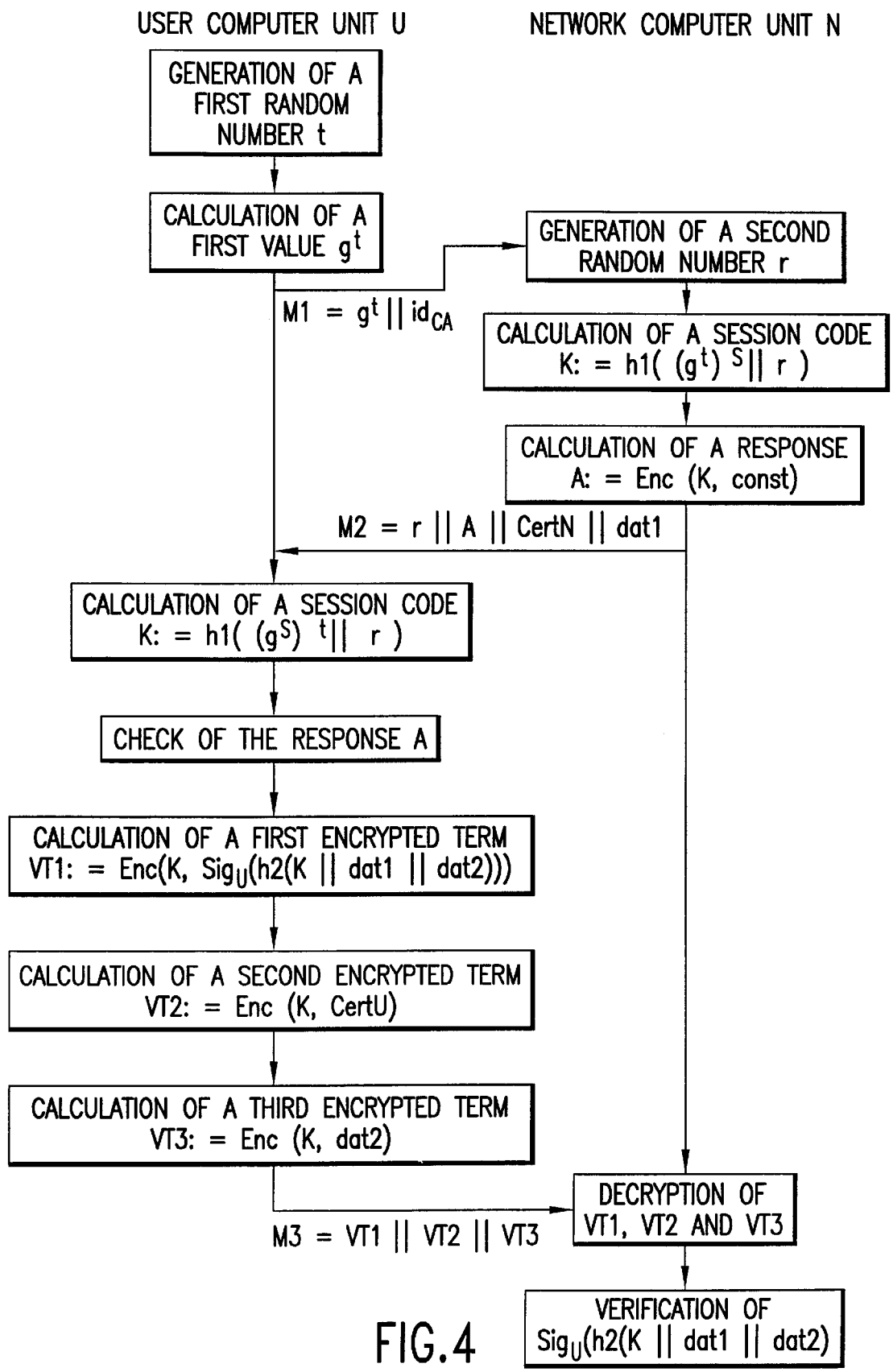
FIG. 4 shows a flow chart which describes the second exemplary embodiment of the method according to the invention, with additionally implemented security aims and with a number of developments.

The sequence of a second exemplary embodiment of the method according to the invention is illustrated by two sketches in FIGS. 3 and 4.

For this exemplary embodiment of the method, it is pre-supposed that a trustworthy public user code $g''$ of the first computer unit U, for example in the form of a user certificate CertU, is made available in the first computer unit U, and that a trustworthy public network code $g^s$ of the second computer unit N, for example in the form of a network certificate CertN is made available in the second computer unit N. The public network code $g^s$ need not be available in the first computer unit U. It is likewise unnecessary for the public user code $g''$ to be available in the second computer unit N.

A first random number t is generated in the first computer unit U. A first value $g^t$ is formed in the first computer unit U from the first random number t with the aid of the generating element g of a finite group.

Once the first value $g^t$ has been calculated, a first message M1 is coded, which has at least the first value $g^t$ and an identity statement $id_{CA}$ of a certifying computer unit CA, which supplies the network certificate CertN, which can be verified by the first computer unit U. The first message M1 is transmitted from the first computer unit U to the second computer unit N.

The first message M1 is decoded in the second computer unit N. The first message M1 can also be transmitted unencrypted via an insecure channel, that is to say via a radio inter-face as well, since it is not possible to take the logarithm of the first value $g^t$ in a reasonable time.

As described in FIG. 4, it is possible to provide for a second random number r to be generated in the second computer unit N. This additional method step achieves an additional security aim: the assurance of the freshness (current validity) of a session code K, which is described in the following text, for the second computer unit N.

A session code K is formed in the second computer unit N with the aid of a first hash function h1. A first term is used as a first input variable of the first hash function h1. The first term is formed by the first value $g^t$ being raised to the power of a secret network code a.

If the second random number r is used, then the first input variable of the first hash function h1 also has at least the second random number r. A response A is now formed in the second computer unit N. Various variants are envisaged for formation of the response A. For example, it is possible for a constant const to be encrypted with the session code K, using an encryption function Enc. The constant const is known both by the first computer unit U and by the second computer unit N. The encryption function Enc is also known both by the second computer unit N and by the first computer unit U, as the encryption function to be used in the method according to the invention.

A further option for forming the response A is, for example, to use the session code K as an input variable for a third hash function h3, and to use the "hashed" value of the session code K as the response. Other options for forming the response A which is used to check the session code K in the first computer unit U are known to the person skilled in the art and may be used as variants of the described procedures.

A second message M2 is formed by arranging in sequence the second random number r, the network certificate CertN, the response A and an optional first data field dat1. The second random number r and the optional first data field dat1 are contained only in the second message M2, if these are provided in the method according to the invention.

The second message M2 is coded in the second computer unit N and is transmitted to the first computer unit U.

The second message M2 is decoded in the first computer unit U, so that the first computer unit U may have available the second random number r, the response A and, possibly, the optional first data field dat1. The optional first data field dat1 may be of any required length, that is to say it is even possible for the optional first data field dat1 not to be present.

The network certificate CertN contained in the second message M2 is now verified in the first computer unit. The public network code $g^s$ is thus available in the first computer unit U.

The session code K is now likewise formed in the first computer unit U, with the aid of the first hash function h1, which is known both by the second computer unit N and by the first computer unit U. A second input variable of the first hash function h1 has at least one second term, in order to form the session code K in the first computer unit U. The second term is formed from exponentiation of a public network code $g^s$ with the first random number t. If the use of the second random number r is envisaged in the method according to the invention, then the second input variable of the first hash function h1 also has the second random number r, in order to form the session code K in the first computer unit U.

The use of the first random number t and of the second random number r in the generation of the session code K ensures that the session code K is currently valid, since the first random number t and the second random number r are in each case used only for in each case one session code K.

This avoids a relatively old code being reused as the session code K. The current validity of the session code K is also important in the context of the question as to how large the first random number t and the second random number r must be. This is significant since the DLP problem is reduced if the random numbers have a shorter length, that is to say the shorter the random number, the easier it is to take the logarithm, that is to say, for example, to find the first random number t from the first value $g^t$. However, if different random numbers are used for each new session code K, then the probability that the session code K which is used has already been found by an unauthorized third party is considerably less. In consequence, the risk that the part of a message which is encrypted with the session code K can be decrypted by an unauthorized third party is considerably reduced.

Once the session code K has been formed in the first computer unit U, the received response A is used to check whether the session code K formed in the first computer unit U corresponds with the session code K which has been formed in the second computer unit N.

Various options for using the response A to check the session code K are envisaged, depending on the variants described above for formation of the response A.

One option, for example, if the response A has been formed in the second computer unit N by encryption of the constant const with the session code K, using the encryption function Enc, is to decrypt the response A, which results in the first computer unit U receiving a decrypted constant const', which is compared with the known constant const.

The checking of the session code K using the response A can also be carried out by the constant const, which is known by the first computer unit U, being encrypted with the session code K, which is formed in the first computer unit U, using the encryption function Enc, and the result being checked for correspondence with the response A. This procedure is also used, for example, when the response A is formed in the second computer unit N, by applying the third hash function h3 to the session code K. In this case, the session code K, which is formed in the first computer unit U, is used in the first computer unit U as the input variable of the third hash function h3. The "hashed" value of the session code K which is formed in the first computer unit U is then checked for correspondence with the response A. This achieves the aim of code confirmation of the session code K.

The second computer unit N is authenticated by the first computer unit U as a result of the fact that the secret network code s is used to calculate the session code K in the second computer unit N, and the public network code $g^s$ is used to calculate the session code K in the first computer unit U. This is achieved provided that the first computer unit U knows that the public network code $g^s$ actually belongs to the second computer unit N.

A signature term is calculated once the session code K has been confirmed by checking the response A. A fourth input variable is formed for this purpose, with the aid of a second hash function h2. The second hash function h2 can be, but need not be, the same hash function as the first hash function h1. A term which contains at least the session code K is used as a third input variable for the second hash function h2. Furthermore, the third input variable may contain the optional first data field dat1 or else an optional second data field dat2, if its use is envisaged in the method according to the invention.

Later, it is not possible to dispute that the data which are contained in the first optional data field dat1 and in the second optional data field dat2 have been transmitted from the first computer unit U.

The data contained in the first optional data field dat1 and in the second optional data field dat2 may be, for example, telephone numbers, the current time or similar parameters suitable for this purpose. This information may be used as a tool for indisputable charge invoicing.

The signature term is formed from at least the fourth input variable, using a first signature function $Sig_U$. The signature term may be encrypted in order to achieve a higher security level. In this case, the signature term is encrypted with the session code K, using the encryption function Enc, and forms the first encrypted term VT1.

In addition, if it is intended to achieve the security aim of "anonymity of the user", a second encrypted term VT2 is calculated, in which a user certificate CertU of the first computer unit U is encrypted with the session code K, with the aid of the encryption function Enc. If an optional second data field dat2 is used, a third encrypted term VT3 can be calculated in the first computer unit U, in that the optional second data field dat2 is encrypted with the session code K using the encryption function Enc. The optional second data field dat2 can likewise be transmitted unencrypted.

A third message M3 is formed and coded in the first computer unit U and has at least the signature term and the user certificate CertU of the first computer unit U. If it is intended to ensure the user anonymity of the first computer unit U, the third message M3 has at least the second encrypted term VT2 instead of the user certificate CertU of the first computer unit U, which term VT2 contains the user certificate CertU of the first computer unit U in encrypted form, which can be decrypted only by the second computer unit N.

If it is intended to use the optional second data field dat2, the third message M3 also has at least the third encrypted term VT3. If the third message M3 has the first encrypted term VT1, the second encrypted term VT2 or the third encrypted term VT3, these are decrypted in the second computer unit N. For the first encrypted term VT1, which may be present, this is done before the verification of the signature term.

The third message M3 is transmitted from the first computer unit U to the second computer unit N.

In addition, the authentication of the first computer unit U with respect to the second computer unit N is ensured by the signature term, whose use guarantees that the third message M3 was actually transmitted, in a form valid at that time, from the first computer unit U.

If temporary user identities are envisaged for the method according to the invention, then the method described above is expanded by a number of method steps.

A new temporary identity variable TMUIN, which is assigned to the first computer unit U from now on, is formed for the first computer unit U in the second computer unit N. This can be done, for example, by generating a random number or by tables in which possible identity variables are stored. A fourth encrypted term VT4 is formed in the second computer unit N from the new temporary identity variable TMUIN of the first computer unit U, in that the new temporary identity variable TMUIN of the first computer unit U is encrypted with the session code K, using the encryption function Enc.

In this case, the second message M2 additionally has at least the fourth encrypted term VT4. The fourth encrypted term VT4 is then decrypted in the first computer unit U. The new temporary identity variable TMUIN of the first computer unit U is now available in the first computer unit U.

In order also to ensure the second computer unit N that the first computer unit U has received the new temporary identity variable TMUIN correctly, the third input variable for the first hash function h1 or for the second hash function h2 also has at least the new temporary identity variable TMUIN of the first computer unit U.

It is also possible not to integrate the new temporary identity variable TMUIN in the signature term, but to form the second encrypted term VT2 in that the new temporary identity variable TMUIN of the first computer unit U is encrypted with the session code K, using the encryption function Enc. In this case, the third message M3 also has the second encrypted term VT2.

Third Exemplary Embodiment

Figure 5A:
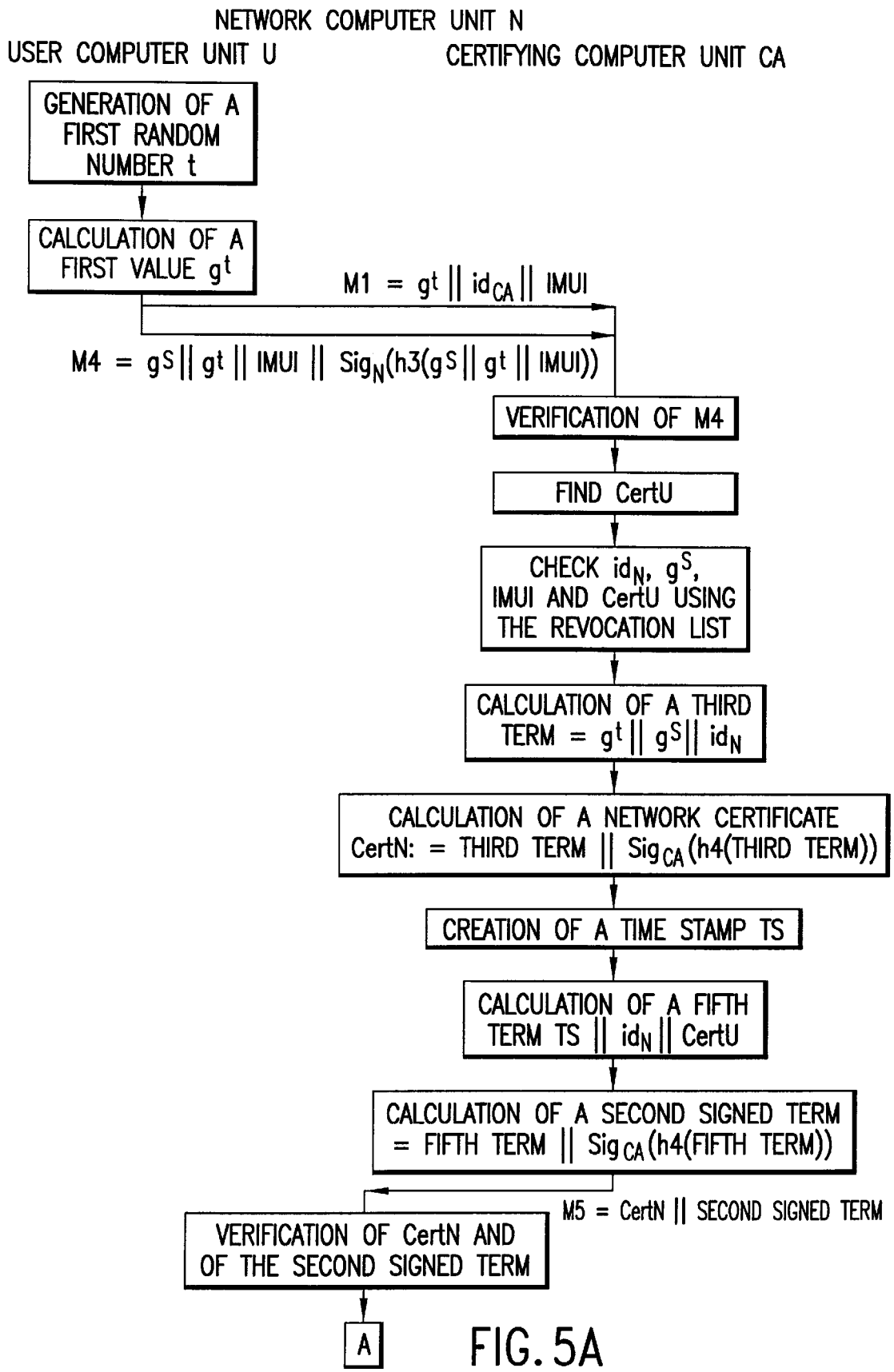
FIGS. 5a, b show a flow chart which illustrates a third exemplary embodiment of the method according to the invention with a number of developments.
Figure 5B:
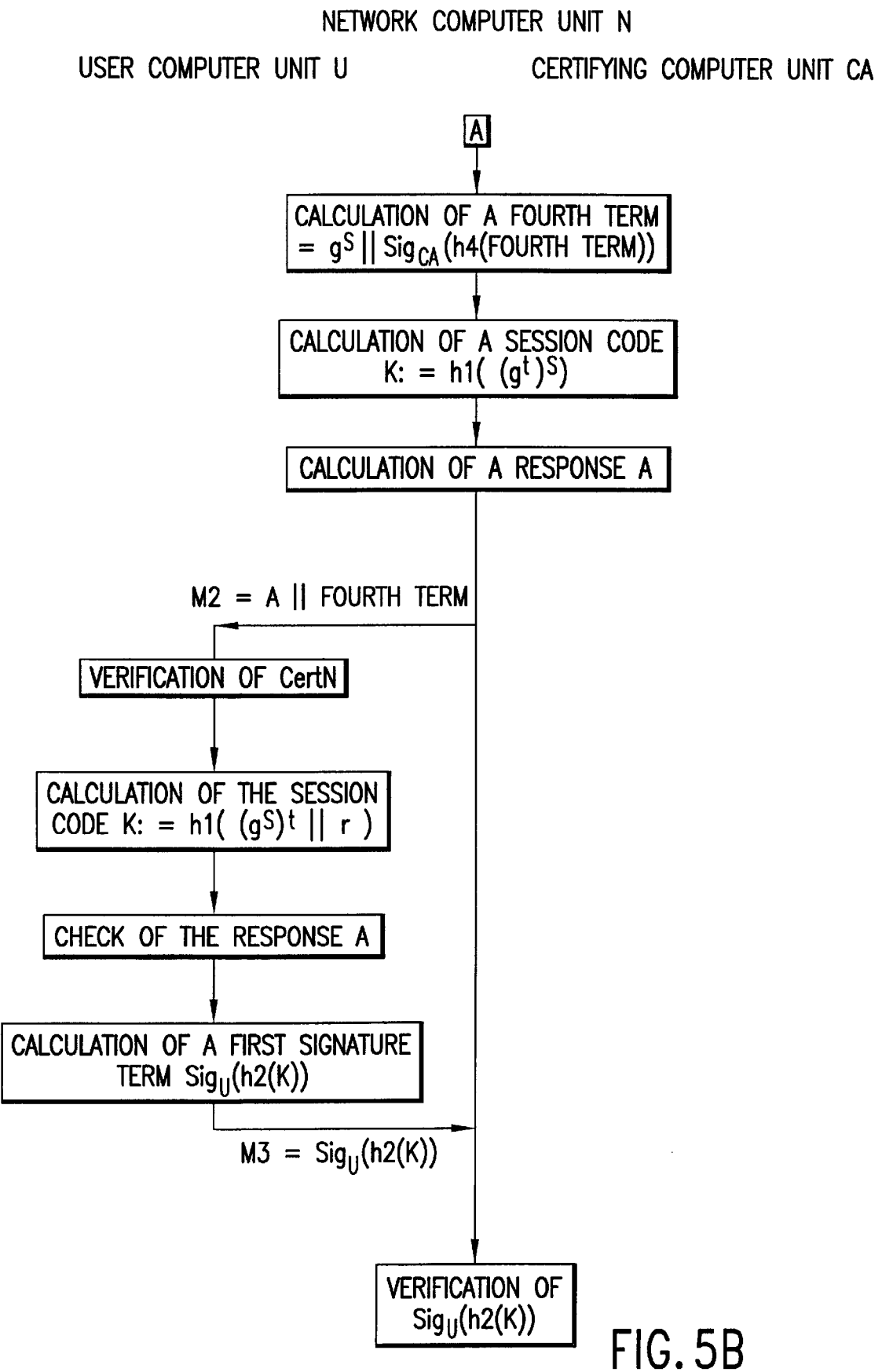
Figure 6A:
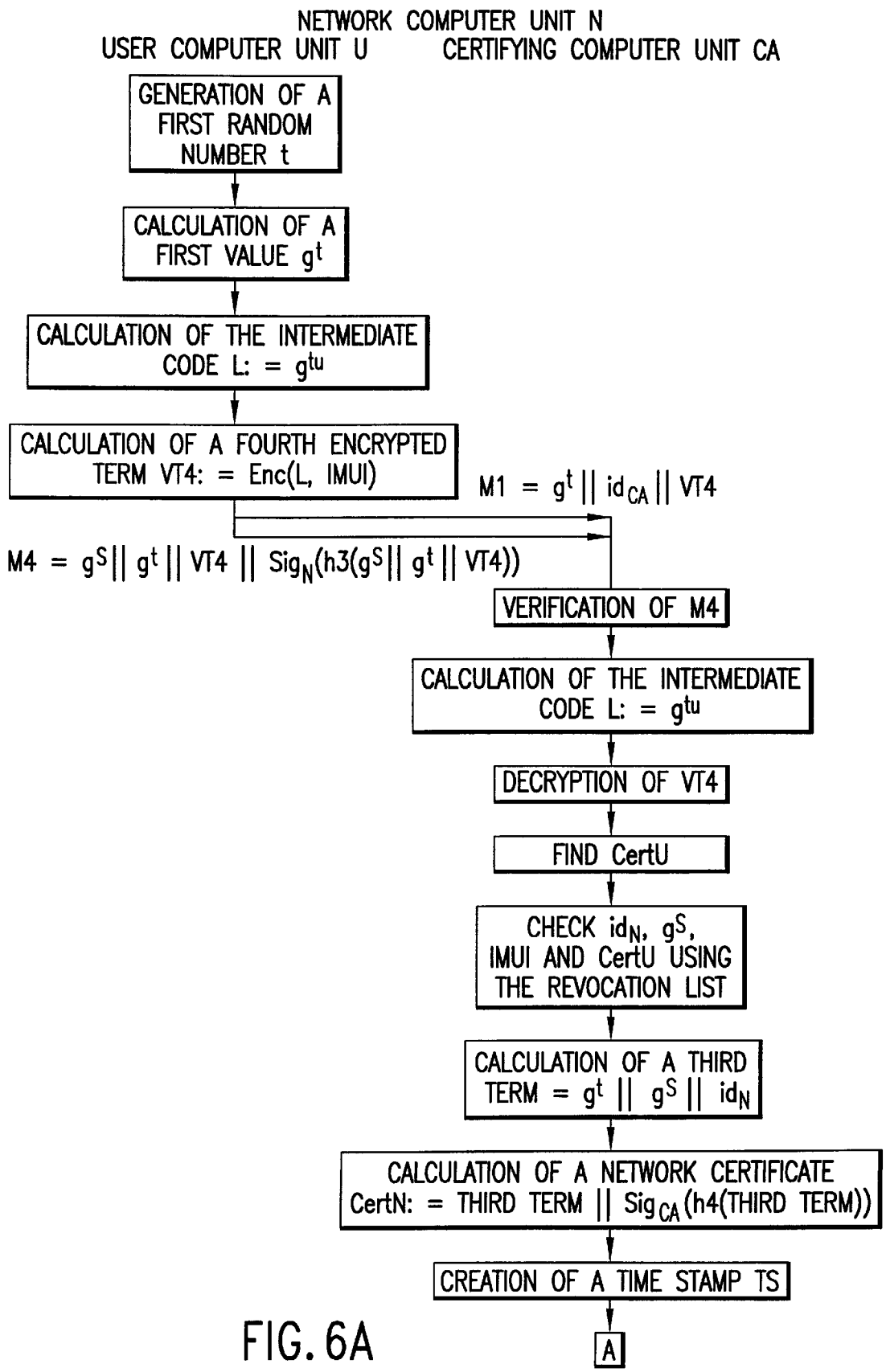
FIGS. 6a, b show a flow chart which describes the third exemplary embodiment of the method according to the invention, with additionally implemented security aims and with a number of developments.
Figure 6B:
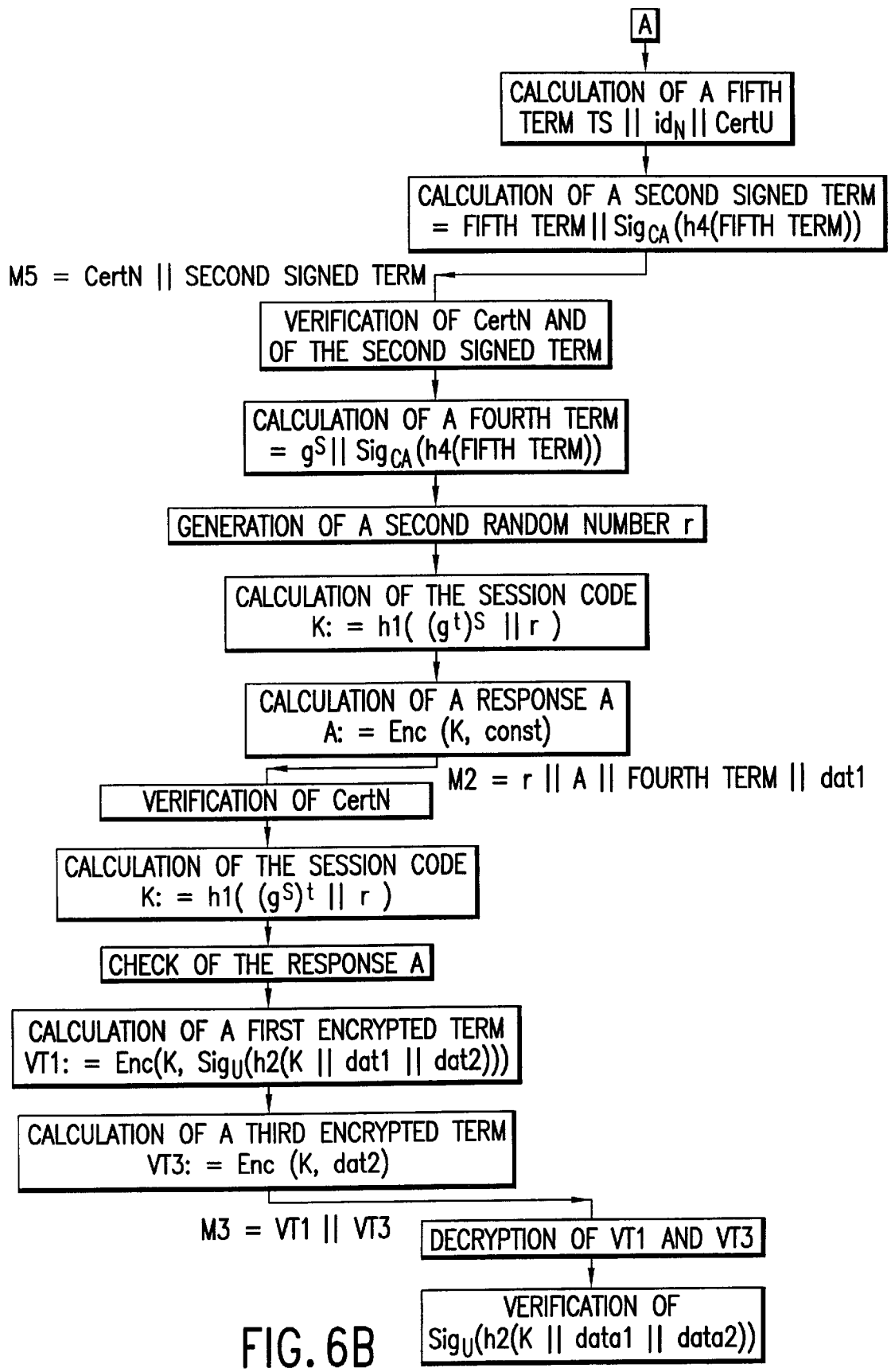

The sequence of a third exemplary embodiment is illustrated by two sketches in FIGS. 5a, b.

For this development of the invention, it is presupposed that no trustworthy public network code $g^s$ of the second computer unit N is available in the first computer unit U. A trustworthy public certifying code $g^u$ of the certifying computer unit CA is available in the user computer unit U, g being a generating element of a finite group. This means that the first computer unit U has to "supply" the trust-worthy public network code $g^s$ in the form of a network certificate CertN from a certifying computer unit CA. In the same way, the second computer unit N needs the trustworthy public user code $g^u$ in the form of a user certificate CertU from the certifying computer CA.

A first random number t is generated in the first computer unit U. A first value $g^t$ is formed in the first computer unit U from the first random number t with the aid of the generating element g of a finite group.

After calculating the first value $g^t$, a first message M1 is coded, which has at least the first value $g^t$, an identity variable IMUI of the first computer unit U and an identity variable $id_{CA}$ of a certifying computer unit CA, which supplies a network certificate CertN which can be verified by the first computer unit U. This is necessary if a plurality of certification instances with different secret certification codes are provided. If it is intended to achieve the security aim of user anonymity, an intermediate code L is formed in the first computer unit U before the formation of the first message M1. This is done by raising the public certifying code $g^u$ to the power of the first random number t. In the following text, the identity variable IMUI of the first computer unit U is encrypted with the intermediate code L, using an encryption function Enc, and the result represents a fourth encrypted term VT4. The fourth encrypted term VT4 is integrated in the first message M1 instead of the identity variable IMUI of the first computer unit U. The first message M1 is transmitted from the first computer unit U to the second computer unit N.

The first message M1 is decoded in the second computer unit N. The first message M1 can also be transmitted, without being encrypted, via an insecure channel, that is to say via a radio interface as well, since it is not possible to take the logarithm of the first value $g^t$ in a reasonable time.

In the second computer unit N, the first message M1 is decoded and a fourth message M4 is formed which has a chain formed by the public network code $g^s$, which is known by the second computer unit N, the first value $g^t$ and the identity variable INUI of the first computer unit U, as well as a first signed term. The first signed term is formed by applying a second signature function $Sig_N$ to a first signature input term. The first signature input term has at least one result of a third hash function h3, which is applied to at least one chain formed by the public network code $g^s$, the first value $g^t$ and the identity variable IMUI of the first computer unit U. In the situation where it is intended to achieve the security aim of user anonymity, the fourth encrypted term VT4 is coded in the fourth message M4, instead of the identity variable IMUI of the first computer unit U. In this case, the chain to which the third hash function h3 is applied also has the fourth encrypted term VT4, instead of the identity variable IMUI of the first computer unit U.

The second signature function $Sig_N$ may be, but need not be, the same as the first signature function $Sig_U$.

The fourth message M4 is coded in the second computer unit N, and is then transmitted to the certifying computer unit CA.

The fourth message M4 is decoded in the certifying computer unit CA and is verified with the public code $g^s$, which is known by the certifying computer unit CA. The second computer unit N is thus authenticated as having sent the fourth message M4.

After this, if user anonymity is ensured, that is to say the fourth encrypted term VT4 has also been sent in the fourth message M4, the intermediate code L is calculated in the certifying computer unit CA, in that the first value $g^t$ is raised to the power of a secret certifying code u of the certifying computer unit CA.

The fourth encrypted term VT4 is decrypted with the inter-mediate code L, using the encryption function Enc, as a result of which the identity variable IMUI of the first computer unit U is known in the certifying computer unit CA.

The user certificate CertU is now determined in the certifying computer unit CA. The user certificate CertU may be determined, for example, from a databank which is dedicated to the certifying computer unit CA and contains all the certificates of the computer units for which the certifying computer unit CA produces certificates.

In order to check the validity of the network certificate CertN and of the user certificate CertU, an identity statement $id_N$ and the public network code $g^s$ which is sent in the fourth message, the identity variable IMUI of the first computer unit U and the determined user certificate CertU are compared with a revocation list, in which invalid certificates, codes or identity variables are listed.

A third term is then formed from at least one chain composed of the first value $g^t$, the public network code go and the identity statement $id_N$ of the second computer unit N.

The third term is "hashed" with the aid of a fourth hash function h4, and the result of the hash function h4 is signed using a third signature function $Sig_{CA}$. A network certificate CertN is now formed in the certifying computer unit CA, the network certificate CertN having at least the third term and the signed hash value of the third term.

Furthermore, a time stamp TS is created, for example, in the certifying computer unit CA.

A fifth term is also formed in the certifying computer unit CA and has at least one chain composed of the time stamp TS, the identity statement $id_N$ of the second computer unit N and the user certificate CertU.

A second signed term is formed by applying the third signature function $Sig_{CA}$ to a second signature input term and to the secret certifying code u. The second signature input term has at least one result of the fourth hash function h4, which is applied to at least the fifth term.

A sixth term is then formed, which has at least the fifth term and the signed hash value of the fifth term.

A fifth message M5 which is formed in the certifying computer unit CA has at least one chain composed of the network certificate CertN and the sixth term.

The fifth message M5 is coded in the certifying computer unit CA and is transmitted to the second computer unit N. Once the fifth message has been decoded in the second computer unit N, the network certificate CertN and the second signed term are verified.

A fourth term is now formed in the second computer unit N, which has at least one chain comprising the public network code $g^s$ and the signed hash value of the third term.

A session code K is formed in the second computer unit N with the aid of a first hash function h1. A concatenation of a first term with the second random number r is used as a first input variable of the first hash function h1. The first term is formed in that the first value $g^t$ is raised to the power of a secret network code s. In this context, a hash function means a function in which it is impossible to calculate a matching input value for a given function value. Furthermore, a fixed length output character sequence is assigned to an input character sequence of any required length. Furthermore, freedom from collisions is required for the hash function in this context, that is to say it must be impossible to find two different input character sequences which give the same output character sequence. The second random number r is used, as described in FIGS. 2a, b, if the additional security aim of assuring freshness (current validity) of the session code K is intended to be achieved for the second computer unit N. If this security aim is not required, the second random number r is not used in the method according to the invention.

A response A is now formed in the second computer unit N. Various versions are provided for formation of the response A. Thus, for example, it is possible for a constant const to be encrypted with the session code K, using an encryption function Enc. The constant const is known both by the first computer unit U and by the second computer unit N. The encryption function Enc is also known both by the second computer unit N and by the first computer unit U, as the encryption function which is to be used in the method according to the invention.

A further option for forming the response A is, for example, to use the session code K as an input variable for a third hash function h3, and to use the "hashed" value of the session code K as the response A. Other options for forming the response A which is used to check the session code K in the first computer unit U are known to the person skilled in the art and may be used as variants of the described procedures.

A second message M2 is formed by arranging in sequence the second random number r, the fourth term of the response A and an optional first data field dat1. The second random number r and the optional first data field dat1 are contained trained only in the second message M2, if these are provided in the method according to the invention.

The second message M2 is coded in the second computer unit N and is transmitted to the first computer unit U.

The second message M2 is decoded in the first computer unit U, so that the first computer unit U may have available the second random number r, the response A and, possibly, the optional first data field dat1. The optional first data field dat1 may be of any required length, that is to say it is even possible for the optional first data field dat1 not to be present.

The session code K is now likewise formed in the first computer unit U, with the aid of the first hash function h1, which is known both by the second computer unit N and by the first computer unit U. A second input variable of the first hash function h1 has at least one second term, in order to form the session code K in the first computer unit U. The second term is formed from exponentiation of a public network code $g^s$ with the first random number t. If the second random number r is provided in the method according to the invention, then the second input variable of the first hash function h1 also has the second random number r, in order to form the session code K in the first computer unit U.

The use of the first random number t and of the second random number r in the generation of the session code K ensures that the session code K is currently valid, since the first random number t and the second random number r are in each case used only for in each case one session code K.

This avoids a relatively old code being reused as the session code K. However, if different random numbers are used for each new session code K then the probability that the session code K which is used has already been found by an unauthorized third party is considerably less. In consequence, the risk that the part of a message which is encrypted with the session code K can be decrypted by an unauthorized third party is considerably reduced.

Once the session code K has been formed in the first computer unit U, the received response A is used to check whether the session code K formed in the first computer unit U corresponds with the session code K which has been formed in the second computer unit N.

Various options for using the response A to check the session code K are envisaged, depending on the variants described above for formation of the response A.

One option, for example, if the response A has been formed in the second computer unit N by encryption of the constant const with the session code K, using the encryption function Enc, is to decrypt the response A, which results in the first computer unit U receiving a decrypted constant conut', which is compared with the known constant const.

The checking of the session code K using the response A can also be carried out by the constant const, which is known by the first computer unit U, being encrypted with the session code K, which is formed in the first computer unit U, using the encryption function Enc, and the result being checked for correspondence with the response A. This procedure is also used, for example, when the response A is formed in the second computer unit N, by applying the third hash function h3 to the session code K. In this case, the session code K, which is formed in the first computer unit U, is used in the first computer unit U as the input variable of the third hash function h3. The "hashed" value of the session code K which is formed in the first computer unit U is then checked for correspondence with the response A. This achieves the aim of code confirmation of the session code K.

The second computer unit N is authenticated by the first computer unit U as a result of the fact that the secret network code s is used to calculate the session code K in the second computer unit N, and the public network code $g^s$ is used to calculate the session code K in the first computer unit U. This is achieved provided that the first computer unit U knows that the public network code $g^s$ actually belongs to the second computer unit N.

A signature term is calculated once the session code K has been confirmed by checking the response A. A fourth input variable is formed for this purpose, with the aid of a second hash function h2. The second hash function h2 can be, but need not be, the same hash function as the first hash function h1. A term which contains at least the session code K is used as a third input variable for the second hash function h2. Furthermore, the third input variable may contain the optional first data field dat1 or else an optional second data field dat2, if its use is envisaged in the method according to the invention.

Later, it is not possible to dispute that the data which are contained in the first optional data field dat1 and in the second optional data field dat2 have been transmitted from the first computer unit U.

The data contained in the first optional data field dat1 and in the second optional data field dat2 may be, for example, telephone numbers, the current time or similar parameters suitable for this purpose. This information may be used as a tool for indisputable charge invoicing.

The signature term is formed from at least the fourth input variable, using a first signature function $Sig_U$. The signature term may be encrypted in order to achieve a higher security level. In this case, the signature term is encrypted with the session code K, using the encryption function Enc, and forms the first encrypted term VT1.

If an optional second data field dat2 is used, a third encrypted term VT3 is calculated in the first computer unit U, in that the optional second data field dat2 is encrypted with the session code K using the encryption function Enc. The optional second data field dat2 can also be transmitted unencrypted, that is to say in plain text.

A third message M3 is formed and coded in the first comuter unit U, which message M3 comprises at least the first encrypted term VT1 and, if the optional second data field dat2 is used, the third encrypted term VT3 or the optional second data field dat2 in plain text. The third message M3 is transmitted from the first computer unit U to the second computer unit N.

In addition, the authentication of the first computer unit U with respect to the second computer unit N is ensured by the signature term in the third message M3, whose use also guarantees that the third message M3 was actually transmitted, in a form valid at that time, from the first computer unit U.

The third message M3 is decoded in the second computer unit N, and the first encrypted term VT1, possibly as well as the third encrypted term VT3, is then decrypted. The signature term is verified on the basis of a user certificate CertU, which is available to the second computer unit N.

If the use of the optional second data field dat2 is envisaged, the third message M3 also has at least the third encrypted term VT3 or the optional second data field dat2 in plain text, if it is intended to transmit the optional second data field dat2 in plain text.

If the third message M3 has the first encrypted term VT1, the second encrypted term VT2 or the third encrypted term VT3, these are decrypted in the second computer unit N. For the first encrypted term VT1, which may be present, this is done before the verification of the signature term.

If temporary user identities are envisaged for the method according to the invention, then the method described above is expanded by a number of method steps.

A new temporary identity variable TMUIN is formed in the second computer unit N for the first computer unit U, and is assigned to the first computer unit U from now on. This can be done, for example, by generating a random number or by tables in which possible identity variables are stored. A fourth encrypted term VT4 is formed in the second computer unit N from the new temporary identity variable TMUIN of the first computer unit U, in that the new temporary identity variable TMUIN of the first computer unit U is encrypted with the session code K, using the encryption function Enc.

In this case, the second message M2 additionally has at least the fourth encrypted term VT4. The fourth encrypted term VT4 is then decrypted in the first computer unit U. The new temporary identity variable TMUIN of the first computer unit U is now available in the first computer unit U.

In order also to ensure the second computer unit N that the first computer unit U has received the new temporary identity variable TMUIN correctly, the third input variable for the first hash function h1 or for the second hash function h2 also has at least the new temporary identity variable TMUIN of the first computer unit U.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for computer-aided interchange of cryptographic codes between a first computer unit and a second computer unit, comprising the steps of:

forming a first value in the first computer unit from a first random number of a finite group using a generating element;

transmitting a first message from the first computer unit to the second computer unit, the first message having at least said first value;

forming a session code in the second computer unit using a first hash function, a first input variable of the first hash function having at least one first term which is formed by exponentiation of the first value with a secret network code;

forming a response in the second computer unit by use of said session code;

transmitting a second message from the second computer unit to the first computer unit, whereby the second message comprises at least the response, said response being transmitted serving for checking of the session code to be formed in the first computer unit and not for formation of the session code in the first computer unit;

forming the session code in the first computer unit using the first hash function, a second input variable of the first hash function having at least one second term which is formed by exponentiation of a public network code using the first random number;

checking the session code in the first computer unit on the basis of the response;

forming a fourth input variable in the first computer unit using one of a second hash function or the first hash function, a third input variable for the first hash function or for the second hash function having at least the session code in order to form the fourth input variable;

forming a signature term in the first computer unit from at least the fourth input variable using a first signature function;

transmitting a third message from the first computer unit to the second computer unit, the third message having at least the signature term of the first computer unit; and verifying the signature term in the second computer unit.

2. The method as claimed in claim 1, wherein the first message also has an identity statement of a certifying computer unit, which supplies a network certificate which is verifiable by the first computer unit;

wherein the second message transmitted from the second computer unit to the first computer unit has at least the network certificate; and wherein the network certificate is verified in the first computer unit.

3. The method as claimed in claim 2 wherein the third message transmitted from the firs t computer unit to the second computer unit also has a user certificate; and wherein the user certificate is verified in the second computer unit.

4. A method for computer-aided interchange of cryptographic codes between a first computer unit and a second computer unit, comprising the steps of:

forming a first value in the first computer unit from a first random number of a finite group using a generating element;

transmitting a first message from the first computer unit to the second computer unit, the first message having at least said first value;

forming a session code in the second computer unit using a first hash function, a first input variable of the first hash function having at least one first term which is formed by exponentiation of the first value with a secret network code;

forming a response in the second computer unit;

transmitting a second message from the second computer unit to the first computer unit, whereby the second message comprises at least the response;

forming the session code in the first computer unit using the first hash function, a second input variable of the first hash function having at least one second term which is formed by exponentiation of a public network code using the first random number;

checking the session code in the first computer unit on the basis of the response;

forming a fourth input variable in the first computer unit using one of a second hash function or the first hash function, a third input variable for the first hash function or for the second hash function having at least the session code in order to form the fourth input variable;

forming a signature term in the first computer unit from at least the fourth input variable using a first signature function;

transmitting a third message from the first computer unit to the second computer unit, the third message having at least the signature term of the first computer unit;

verifying the signature term in the second computer unit;

the first message also has an identity variable of the first computer unit and an identity statement of a certifying computer unit which supplies to a third computer unit a network certificate which is verifiable by the first computer unit;

wherein a fourth message, which is transmitted following the first and preceding the second message, is transmitted from the second computer unit to the certifying computer unit, the fourth message having at least the public network code, the first value and the identity variable of the first computer unit as an input variable, and an output variable of a third hash function being signed using a second signature function;

wherein a first signed term is verified in the certifying computer unit;

wherein a third term is formed in the certifying computer unit, which third term has at least the first value, the public network code and an identity statement of the second computer unit;

wherein a hash value up to the third term is formed in the certifying computer unit using a fourth hash function;

wherein the hash value up to the third term is signed in the certifying computer unit using a third signature function with a secret certifying code;

wherein a network certificate is formed in the certifying computer unit, which network certificate has at least the third term and a signed hash value of the third term;

wherein the fourth hash function is applied in the certifying computer unit to a fourth term, which has at least the identity statement of the second computer unit and a user certificate;

wherein the hash value of the fourth term is signed using the third signature function with the secret certifying code, and a result thereof represents the second signed term;

wherein a fifth message which follows the first and precedes the second message, and which has at least the network certificate, the fifth term and the second signed term, is transmitted from the certifying computer unit to the second computer unit;

wherein the network certificate and the second signed term are verified in the second computer unit;

wherein a fifth term, which has at least the public network code and the signed hash value of the third term, is formed in the second computer unit;

wherein the second message transmitted from the second computer unit to the first computer unit has at least the fifth term; and wherein the network certificate is verified in the first computer unit.

5. The method as claimed in claim 4, in which the fourth term also has a time stamp.

* * * * *